J. RIISE.
CHANGE SPEED GEARING.
APPLICATION FILED JULY 3, 1919.
1,355,506.
Patented Oct. 12, 1920.
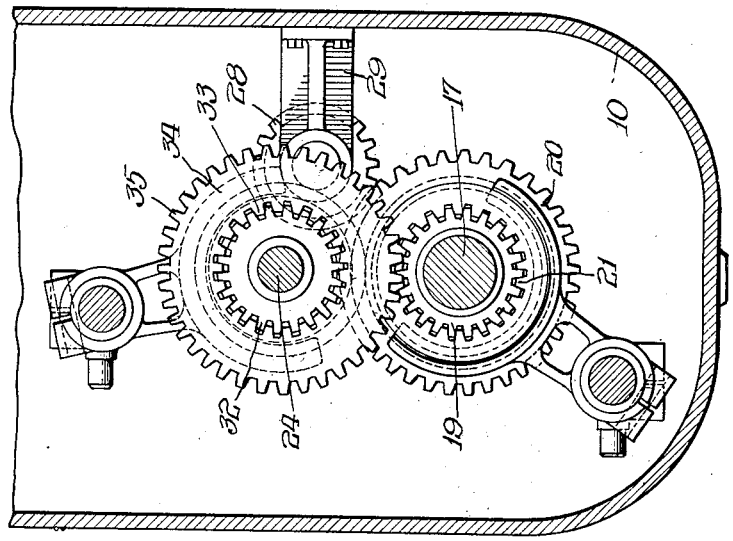
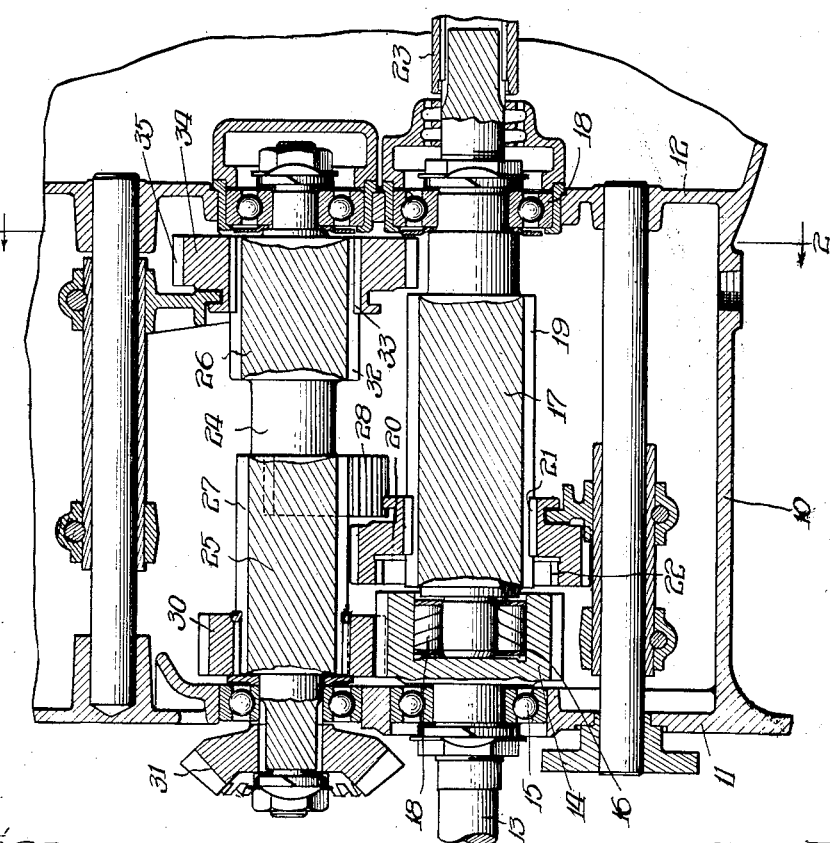
Witnesses
R. Burkhardt
Chas. L. Byron
Inventor
John Riise,
By Wilkinson & Huxley
attys

UNITED STATES PATENT OFFICE.

JOHN RIISE, OF DOYLESTOWN, OHIO.

CHANGE-SPEED GEARING.

1,355,506.    Specification of Letters Patent.    Patented Oct. 12, 1920.

Continuation of application Serial No. 285,542, filed May 27, 1919. This application filed July 3, 1919. Serial No. 308,508.

*To all whom it may concern:*

Be it known that I, JOHN RIISE, a subject of the King of Norway, residing at Doylestown, in the county of Wayne and State of Ohio, have invented certain new and useful Improvements in Change-Speed Gearing, of which the following is a specification.

This invention relates to change speed gearing.

One object of this invention is to reduce the number of gears in change speed gearing and at the same time maintain a given number of speed changes.

Another object is to provide a simple and durable change speed gearing arrangement adapted to meet the various requirements for successful commercial operation.

These and other objects are accomplished by means of the change speed gearing arrangement disclosed on the accompanying sheet of drawings, in which:

Figure 1 is a longitudinal sectional view taken through my change speed gearing; and, Fig. 2 is a sectional view taken in the plane of line 2—2 of Fig. 1.

The various novel features of my invention will be apparent from the following description and drawings and will be particularly pointed out in the appended claims.

Referring to the figures of the drawings, it will be noted that I have shown a gear casing 10 having vertical partitions 11 and 12 for supporting parts to be referred to hereinafter. The clutch shaft 13 is operatively connected to the main driving gear 14, the hub of which is rotatably supported in a bearing 15 carried by the vertical case partition 11. Journaled within a hollowed out or pocket portion 16 in the gear 14 is one end of the main gear shaft 17, there being suitable bearing means 18 interposed between said end of the shaft 17 and the gear 14 within the pocket portion 16 thereof. The opposite end of the main shaft 17 is supported in a bearing 18' carried by the case partition 12. This main shaft 17 is provided with gear teeth 19 throughout its length, which gear teeth serve a double function, first, as a gear, and second, as a splined connection for a gear 20 having internal teeth 21 interfitting with the teeth 19 and being slidably mounted upon the shaft 17. This gear 20 also has internally arranged teeth 22 which clutch with the teeth of the main drive gear 14 for making a direct driving connection between the clutch shaft 13 and the coupling shaft 23 leading toward the worm and traction wheels to be driven. Extending between and supported by the casing partitions 11 and 12 is a countershaft 24 having a reduced portion 25 and a relatively large portion 26. The reduced portion 25 is provided with teeth 27, which constantly are in mesh with a reverse idler gear 28 suitably supported within the gear casing 10 and preferably by a bracket 29 extending from one side of the casing and formed integrally therewith. Teeth 27 are cut in one operation and serve the double purpose of meshing with the idler 28 and fixedly securing gear 30 to the countershaft 24, gear 30 being constantly in mesh with the main drive gear 14 for driving the countershaft 24. To one end of the shaft 24 outside of the casing partition 11 is a beveled gear 31 which may be used for driving a belt pulley, for example, as shown in my copending application Serial No. 285,542, filed May 27, 1919, of which this present application is a continuance. The relatively large portion 26 of the countershaft 24 is provided with gear teeth 32 which interfit with internal teeth 33 of a gear 34 having external teeth 35. There again the external teeth 32 on the countershaft portion 26 serve a double function, first, as a gear, and, second, as a splined connection between the shaft portion 26 and the gear 34. The gear 34 may be moved longitudinally on the countershaft 26 to cause gear teeth 35 to mesh with the teeth 19 on the main shaft 17 for forming the high speed forward connection. There are but two shiftable gears, namely, gears 20 and 34. These may be shifted by any suitable mechanism, as shown herein, or otherwise. Gear 20 has two neutral positions. As shown, it occupies one neutral position intermediate the main drive gear 14 and the reverse idler gear 28. Its other neutral position is beyond reverse gear idler 28. Gear 34 has one neutral position which it occupies as shown in Fig. 1 of the drawings.

The gearing connections for changing speed and direction conditions are as follows: With gear 34 in its neutral position, as shown, gear 20 may be shifted to the left to clutch with main drive gear 14, whereupon a direct intermediate forward speed connection will be made. If the gear 20 is shifted to the right into mesh with the reverse gear idler 28, motion will be transmitted from the main gear 14 through gear 30, shaft gear teeth 27, reverse gear idler 28, gear 20, shaft 17 and through connection 23. If the gear 20 is shifted farther to the right beyond reverse gear idler 28, it will first move into its second neutral position and then into mesh with countershaft gear teeth 32 forming the low speed forward driving connection. With the gear 20 in either of its neutral positions gear 34 may be shifted to the left to move its teeth into mesh with shaft teeth 19 for establishing the high speed forward driving connection.

This change speed gear mechanism may be termed a combination of progressive and selective types. It is progressive in the sense that to change from direct intermediate speed connection to low speed connection, or vice versa, it is necessary to pass through the reverse connection. It is selective in that the reverse connection can be made directly from any one of the three forward speed driving connections, and vice versa, and from direct intermediate speed and low speed directly into high speed, and vice versa.

It will be noted that one of the advantageous features of this change speed gearing is the elimination of gears, the shafts serving not only as shafts but also as gears. In this transmission the splines are regular gear teeth, there being corresponding internal teeth in the sliding gears 20 and 34. Thus the teeth of main drive shaft 17 serve as the high speed pinion when engaged with teeth 35 or gear 34. The teeth 32 on countershaft portion 26 serve as a low speed pinion when engaged with the teeth of gear 20. Teeth 27 on countershaft portion 25 serve as the reverse pinion in constant engagement with the reverse idler gear 28 and also as clutch for engaging internal teeth of gear 30 for holding same in fixed relation to countershaft 24.

This construction eliminates extra gears and parts, and, therefore, simplifies the construction and permits a very strong construction of the shafts and also provides an arrangement adapted to meet all of the requirements for successful commercial operation.

It is my intention to cover all modifications falling within the spirit and scope of the following claims.

I claim:

1. In change speed gearing, the combination of gearing members whereby a plurality of forward speed connections and a reverse connection may be made, the forward speed connections being made at different sides of the reverse speed connection, said gear members being arranged whereby reverse connection can be made directly from any of said plurality of forward speed connections without making another forward speed connection, one of said gear members engaging a reverse gear in going from one forward speed connection to another.

2. In change speed gearing, the combination of gear members whereby three forward speed connections and a reverse connection may be made, said gear members being arranged whereby a reverse connection can be made directly from any of said three forward speed connections without making another forward speed connection, one of said gear members engaging a reverse gear in going from one forward speed connection to another and being movable from one side of said reverse gear to the other.

3. In change speed gearing, the combination of gear members whereby high, low and intermediate speed connections and a reverse connection may be made, said gear members being arranged whereby a reverse connection can be made directly from any of said forward speed connections without making another forward speed connection and whereby high forward speed connection may be made directly from low and intermediate speed connections, one of said gear members engaging a reverse gear in going from one forward speed connection to another and being movable from one side of said reverse gear to the other.

4. In change speed gearing, the combination of gear members whereby high, low and intermediate forward speed connections and a reverse connection may be made, said gear members being arranged whereby a reverse connection can be made directly from any of said forward speed connections without making another forward speed connection, and vice versa, whereby high forward speed connection may be made directly from low and intermediate speed connections, and vice versa, one of said gear members engaging a reverse gear in going from one forward speed connection to another, the reverse connection being located between two forward speed connections.

5. In change speed gearing, the combination of a main shaft and a countershaft, each having gear teeth thereon acting as gears, and gears slidably mounted upon the gear teeth of said shafts whereby various speed connections may be made.

6. In change speed gearing, the combination of a main shaft and a countershaft in gearing relationship with each other, one of said shafts having gear teeth formed thereon for acting as gear, and a gear slidably mounted on the gear teeth of said shaft for changing speed gearing connections.

7. In change speed gearing, the combination of a main shaft and countershaft, each having gear teeth formed thereon, and gears slidably mounted over said gear teeth, said gears arranged to mesh with gear teeth of the other shaft for changing speed gearing connections.

8. In change speed gearing, a main shaft, a countershaft, each having teeth formed thereon, a reverse idler gear in mesh with the teeth on the countershaft, and a gear slidably mounted over the teeth on the main shaft and movable into mesh with the reverse idler gear for changing the driving connection.

9. In change speed gearing, a main drive gear, a main shaft and a countershaft, a gear mounted on said countershaft and in mesh with said main drive gear, said countershaft having gear teeth formed thereon, and a gear mounted on said main shaft movable into a direct clutch connection with said main drive gear and movable into mesh with the teeth of said countershaft for changing the driving connection.

10. In change speed gearing, a main drive gear, a main shaft, a countershaft, a gear mounted on said countershaft and in mesh with said main drive gear, said countershaft having gear teeth formed thereon, a gear mounted on said main shaft movable into a direct clutch connection with said main drive gear and movable into mesh with the teeth of said countershaft for changing the driving connection, and a reverse idler gear in mesh with the teeth of said countershaft, the gear on said main drive shaft also being movable into mesh with said reverse idler gear for establishing reverse connections.

11. In change speed gearing, a main drive gear, a main shaft, a countershaft, a gear mounted on said countershaft and in mesh with said main drive gear, said countershaft having gear teeth formed thereon, a gear mounted on said main shaft movable into a direct clutch connection with said main drive gear and movable into mesh with the teeth on said countershaft for changing the driving connection, and a gear mounted upon said countershaft and movable into mesh with gear teeth formed on said main shaft for changing speed connections.

12. In change speed gearing, a main drive gear, a main shaft, a countershaft, a gear mounted on said countershaft and in mesh with said main drive gear, said countershaft having gear teeth formed thereon, a gear mounted on said main shaft movable into a direct clutch connection with said main drive gear and movable into mesh with the teeth of said countershaft for changing the driving connection, a reverse idler gear in mesh with the teeth of said countershaft, the gear on said main drive shaft also being movable into mesh with said reverse idler gear for establishing reverse connections, and a gear mounted upon said countershaft and movable into mesh with gear teeth formed on said main shaft for changing speed connections.

13. In change speed gearing, the combination of a plurality of shafts, a reverse idler gear geared to one of said shafts, a gear slidably mounted upon one of said shafts and movable into gearing relationship with the other shaft and having one neutral position, and a gear on one of said shafts movable into gearing relationship with said reverse idler gear and the other shaft and having two neutral positions, one on each side of said reverse idler gear.

14. In change speed gearing, the combination of a main shaft, a countershaft, a reverse idler gear in driving relationship with said countershaft, a gear slidably mounted upon said countershaft and movable into gearing relationship with said main shaft and having one neutral position, and a gear slidably mounted upon said main shaft movable into mesh with said reverse idler gear and a gear on the countershaft and having two neutral positions, one on each side of said reverse idler gear.

Signed at Chicago, Illinois, this 26th day of June, 1919.

JOHN RIISE.